United States Patent [19]
Cook et al.

[11] 4,021,772
[45] May 3, 1977

[54] SYSTEM FOR RECORDING SEISMIC REFLECTION SIGNALS IN TRUE AMPLITUDE

[75] Inventors: Thomas W. Cook; Carl A. Quaglino, both of Dallas, Tex.

[73] Assignee: Mobil Oil Corporation, New York, N.Y.

[22] Filed: Apr. 28, 1975

[21] Appl. No.: 572,231

[52] U.S. Cl. .......................... 340/15.5 DP; 340/7 R; 340/15.5 GC; 179/15 BL; 340/174 LC
[51] Int. Cl.² .................... G01V 1/28; G01V 1/32
[58] Field of Search .... 340/7 R, 15.5 DP, 15.5 GC, 340/15.5 FC, 142.6, 172.5 (1), 174 LC, 174 BA; 179/15 BL; 235/173, 176; 445/1

[56] References Cited
UNITED STATES PATENTS

| | | | |
|---|---|---|---|
| 3,376,557 | 4/1968 | Godinez | 340/172.5 |
| 3,466,596 | 9/1969 | Siems et al. | 340/15.5 DP |
| 3,535,501 | 10/1970 | Porter | 340/15.5 DP |
| 3,562,504 | 2/1971 | Harris | 340/15.5 GC |
| 3,675,194 | 7/1972 | Borkovsky et al. | 340/15.5 DP |
| 3,699,325 | 10/1972 | Montgomery et al. | 179/15 BL |

*Primary Examiner*—Nelson Moskowitz
*Attorney, Agent, or Firm*—C. A. Huggett; George W. Hager, Jr.

[57] ABSTRACT

A seismic exploration system employs a seismic energy source, a plurality of seismic energy detectors, and a seismic recording system. The recording system employs amplifiers, a multiplexer, and an analog-to-digital converter for converting analog seismic reflection signals resulting from repetitive firings of the seismic energy source to a serial output of multiplexed digital samples. Each digital sample is applied to a shift register and shifted along the shift register a number of positions equal to the digital number that represents the amount of the amplification applied to the seismic reflection signal by an amplifier in the recording system. Each digital sample is then strobed out of the shift register to a utilization device and represents the amplitude of that portion of the seismic reflection signal represented by the digital sample and as originally received by the recording system from the seismic energy detectors.

2 Claims, 3 Drawing Figures

I/O CONTROLLER

SYSTEM FOR RECORDING SEISMIC REFLECTION SIGNALS IN TRUE AMPLITUDE

BACKGROUND OF THE INVENTION

This invention relates to seismic exploration and more particularly to a system for simultaneously recording a plurality of seismic reflection signals in a plurality of recording channels and for producing a seismic record of such seismic reflection signals.

In seismic exploration, it has been found desirable to employ a plurality of seismic energy detectors to simultaneously record seismic analog reflection signals generated by the activation of one or more seismic energy sources. These seismic energy detectors are connected to a seismic recording system having a plurality of recording channels, the output of each detector being applied to one of the recording channels. It has become conventional practice in digital field recording systems to sequentially and repeatedly sample through each of the recording channels to produce a serial output of multiplexed digital samples of the plurality of seismic analog reflection signals. These multiplexed digital samples are then conventionally recorded on magnetic tape in the multiplexed format as illustrated in FIG. 2.

SUMMARY OF THE INVENTION

The present invention is directed toward a seismic exploration system for recording a plurality of seismic reflection signals. More particularly, it is directed toward a method and system for the recording of seismic reflection signals after such signals have been amplified by conventional digital field recording techniques.

In this aspect, seismic analog reflection signals are recorded on separate field recording channels. The analog signal in each channel is amplified and converted to a digital signal, each digital signal being comprised of a plurality of data bits. A gain signal is produced representing the amount of the amplification in the channel, the gain signal being comprised of a plurality of gain bits. The data bits of the digital signal are applied to a shift register and shifted along the shift register in response to clock pulses. These clock pulses are counted and the cumulative count is applied to a comparator along with the gain bits. When the cumulative count of clock pulses equals the digital number represented by the gain bits, the shifting of the data bits along the shift register is terminated and the contents of the shift register strobed out to a utilization device. The positions of the data bits along the shift register as they are strobed out indicate the amplitude of the seismic reflection signal prior to its amplification in the recording channel.

Following the processing of the digital signals for all the recording channels through the shift register, there can be directly produced a seismic record on which the original amplitudes of the seismic reflection signals as received by the recording system from the seismic energy detectors have been restored.

DESCRIPTION OF THE PREFERRED EMBODIMENT

Figure 1:
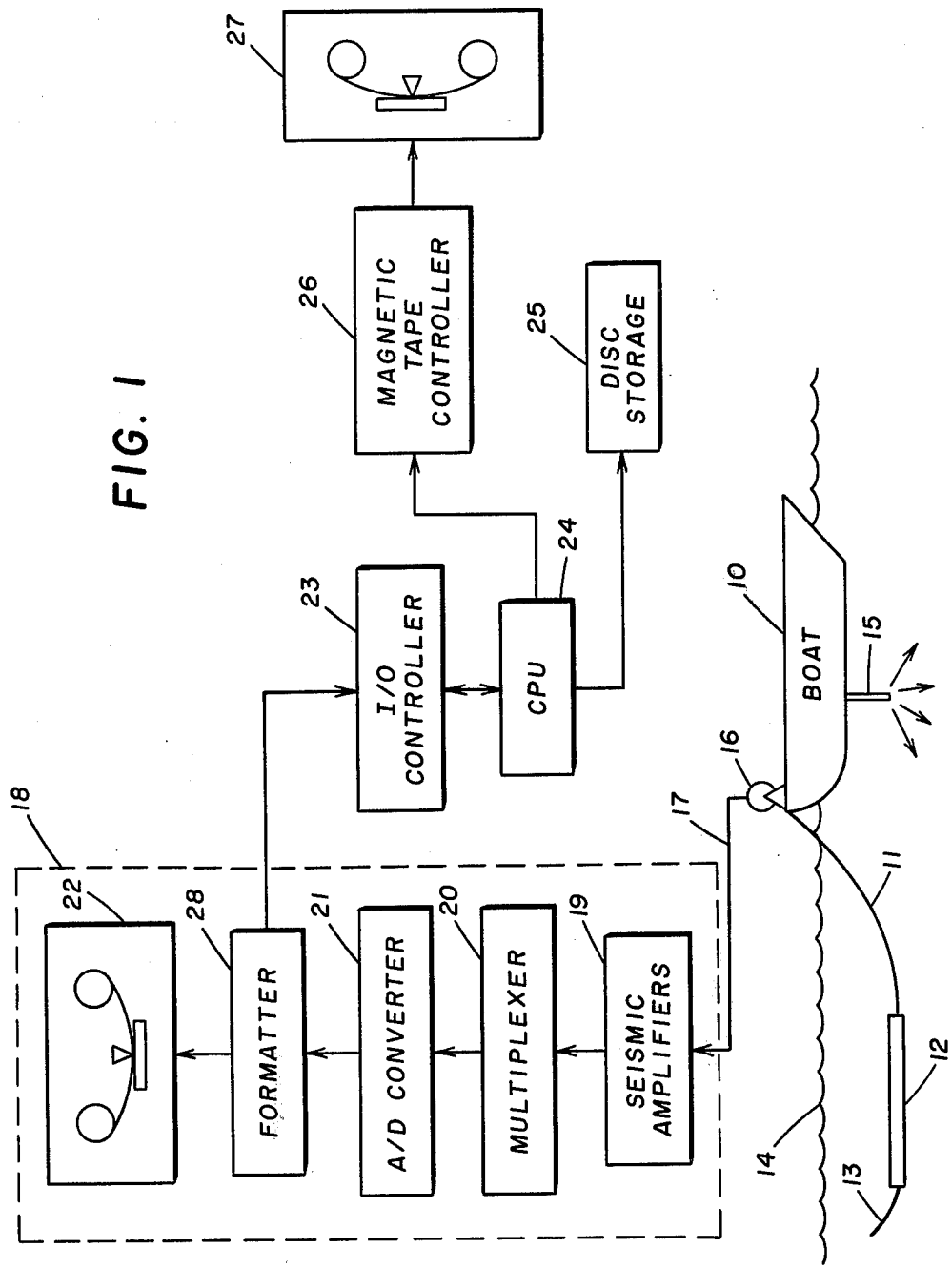
FIG. 1 depicts a seismic marine exploration system embodying the present invention.

Illustrated in FIG. 1 is a seismic exploration system employed in carrying out the present invention. A marine vessel 10 traverses a seismic exploration path in surveying the subsurface formation below the water layer. Streaming behind the vessel 10 by means of a cable 11 is a hydrophone streamer 12 employing a plurality of conventional seismic energy detectors. Streamer 12 is further connected by a cable 13 to a surface support buoy 14. The acoustic detectors employed in the streamer 12 generate electrical signals in response to the reception of acoustic reflections from the subsurface formations caused by the generation of acoustic pressure waves from a seismic energy source 15 suspended from the vessel 10. Source 15 may employ any suitable type of marine acoustic energy generators such as, for example, the type disclosed in U.S. Pat. No. 3,506,085 to George B. Loper wherein an electrical signal operates an electromagnetic valve to allow high-pressure air to be suddenly released from a chamber within the gun, thereby providing an acoustic impulse into the water for the generation of an acoustic pressure wave.

Figure 2:
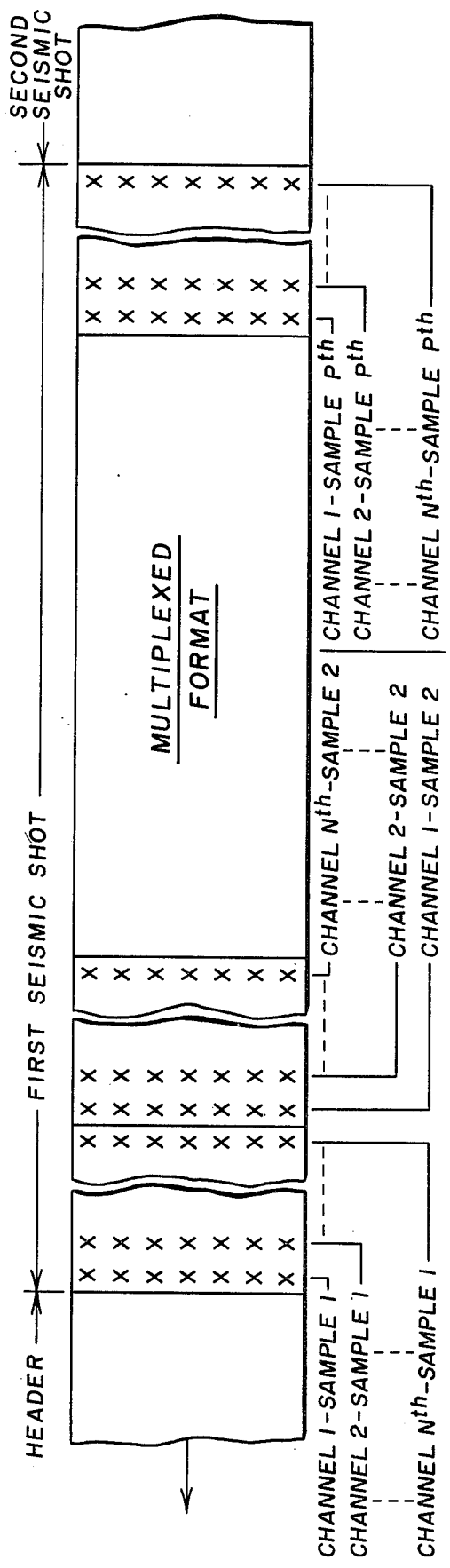
FIG. 2 illustrates a particular data recording format for the seismic reflection signals utilized in the seismic marine exploration system of FIG. 1.

Seismic reflection signals from the detectors of the streamer 12 are connected by way of the cable 11 to a reel 16 mounted on the vessel 10. From the reel 16, these seismic signals are connected by way of cable 17 to a seismic field recorder 18. The recording of the seismic signals by the field recorder 18 is conventionally carried out by means of seismic amplifiers 19, multiplexer 20, analog-digital converter 21, formatter 28, and magnetic tape transport 22. In such a field recorder, the seismic analog reflection signal from each detector is applied to a separate recording channel and amplified by the seismic amplifier in that channel. The multiplexer 20 rapidly switches sequentially from the first to the last of the recording channels and applies the samples at the outputs of the respective seismic amplifiers through the analog-digital converter 21 and the formatter 28 to the magnetic tape transport 22 for recording. The multiplexed digital format conventionally used for the recording of the digital samples on the magnetic tape recording of transport 22 is shown in FIG. 2. One such conventional field recorder is the Texas Instruments Model DFS IV Digital Field Recorder.

A single byte of digital bits (X's) is shown as being recorded across the magnetic tape for each digital sample. Following the first seismic shot, the multiplexer 20 rapidly switches sequentially from the first to the last of the seismic recording channels to obtain these samples (i.e., CHANNEL 1 - SAMPLE 1 through CHANNEL N - SAMPLE 1). The second set of samples (i.e., CHANNEL 1 - SAMPLE 2 through CHANNEL N - SAMPLE 2) is obtained from a second sequential switching of multiplexer 20 across the seismic recording channels. After the last of the set of samples (i.e., SAMPLE P) has been recorded for each seismic channel, a second seismic shot is produced and the resulting seismic signals recorded in similar manner. Accordingly, it can be seen that the digital samples representing the received seismic reflection signals are conventionally recorded in a multiplexed digital format. Although a single byte of digital bits is shown in FIG. 2 for each sample, any number of bytes may conventionally be employed. Further, although (7) digital bits are shown in FIG. 2 for each sample, any number of bits may be conventionally employed as is necessary to record data and gain information. In addition, a block bit, a clock bit, a parity bit, and a sign bit may also be recorded.

In the processing of a seismic record made by the foregoing-described conventional seismic exploration system, the interpreter is not able to observe the original amplitude of the seismic reflection signals as they were received by the seismic energy detectors prior to amplification in the field recorder. It is, therefore, a specific feature of the present invention to provide a method and system by which such original amplitudes can be recovered from the outputs of such a conventional field recorder.

Figure 3:
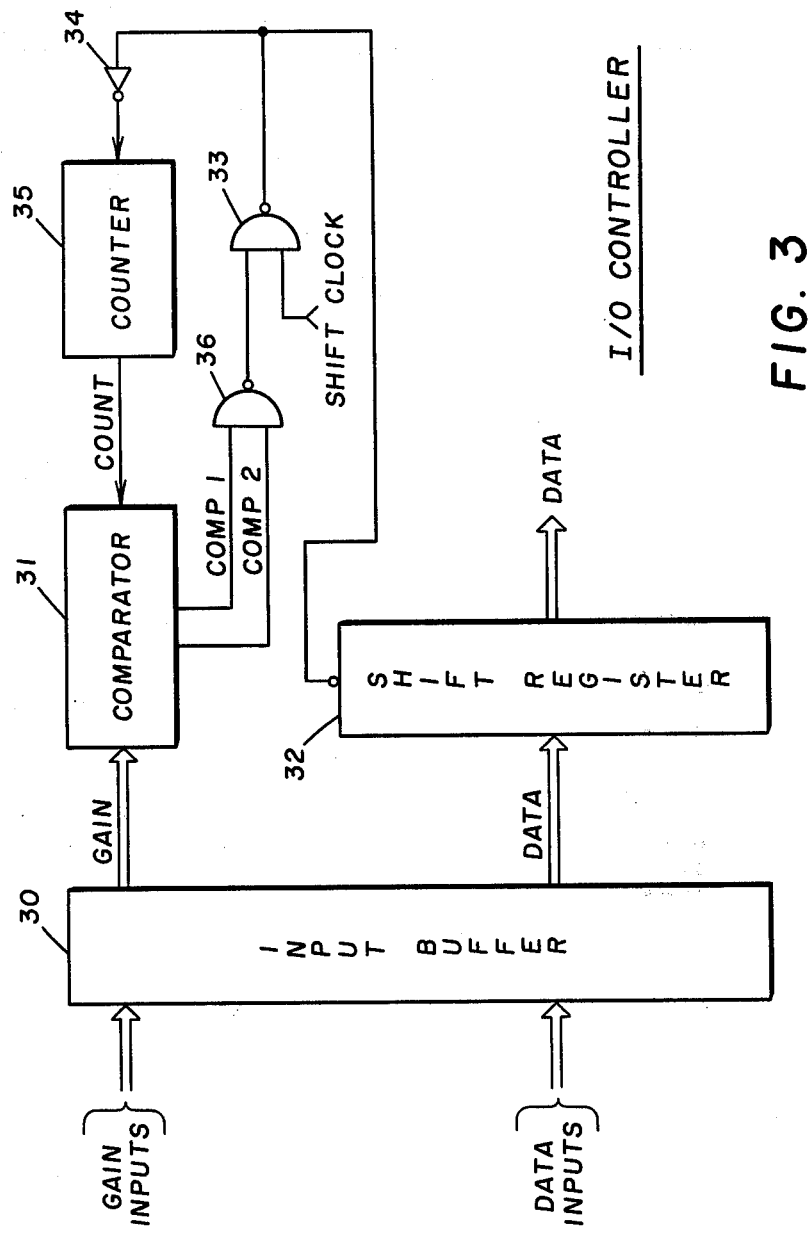
FIG. 3 illustrates in block diagram form the I/O controller portion of the seismic marine exploration system of FIG. 1.

In carrying out the present invention, there is provided the input/output (I/O) controller 23 and the central processor unit (CPU) 24. In the preferred embodiment, the CPU 24 comprises a Texas Instruments Model 980 A Computer (32K memory) including the following peripheral control equipment: I/O expansion chassis, disc controllers, and block transfer controllers. The I/O controller 23 is illustrated in schematic form in FIG. 3 and will now be described in detail.

Inputs to the I/O controller 23 are the multiplexed, digital samples of the seismic reflection signals from the field recorder 18. The data bits representing the magnitudes of the amplified seismic reflection signals and the gain bits representing the units of amplification applied to these seismic reflection signals by the seismic amplifiers 20 are applied to an input buffer 30. Input buffer 30 comprises a plurality of flip-flops, one for each data bit and one for each gain bit. These flip-flops may preferably be Texas Instruments SN74174 flip-flops. These flip-flops are set to the logic states of their corresponding data-bit or gain-bit inputs in response to a strobe signal from the CPU 24. The outputs of the gain-bit flip-flops are applied to a comparator 31, while the outputs of the data-bit flip-flops are loaded into a shift register 32. These data bits are then shifted down one position in the shift register 32 in response to each shift clock pulse generated by the CPU 24 and applied to the shift clock input of shift register 32 by way of the NAND gate 33. Each shift clock pulse is also applied by way of NAND gate 33 and inverter 34 to a counter 35. Counter 35 provides a count signal to the comparator 31, indicative of the cumulative count of shift clock pulses occurring after the data bits have been strobed into the shift register 32.

Comparator 31 compares this count signal to the binary number represented by the gain bits as stored in the input buffer 30. So long as the cumulative count of the shift clock pulse is less than the binary number represented by the gain bits, the comparator 31 provides a comparison 1 control signal through NAND gate 36 to NAND gate 33. During the presence of the comparison 1 control signal, NAND gate 33 continues to apply shift clock pulses to both shift register 32 and counter 35. This allows the data bits to be continually shifted down the shift register 32.

Upon the cumulative count of the shift clock pulses becoming equal to the binary number represented by the gain bits, the comparator 31 provides a comparison 2 control signal through the NAND gate 36 to NAND gate 33. This comparison 2 control signal prevents NAND gate 33 from applying any further shift clock pulses to the shift register 32 and the counter 35. At this point, the data bits have been shifted down the shift register 32 a number of bit positions equal to the number of units of amplification that have been applied to these data bits by the seismic field recorder 18. Consequently, the position of these data bits at the outputs of the shift register 32 following the termination of shifting represents the original amplitude of these data bits prior to their amplification by an amplifier in the seismic field recorder 18.

More particularly, if the amplification of the data bits in the seismic amplifiers of the field recording system were (7), for example, the number represented by the gain bits would be 111 in a quaternary system or should a binary gain system be utilized the gain bits would be 0111. The data bits are shifted down the shift register 32 by the shift clock pulses until the counter 35 has counted seven (7) shift clock pulses for the binary system or fourteen (14) shift clock pulses for the quaternary system. At this time, the output of the counter is 111, and the comparator 31 provides the comparison 2 control signal for terminating the application of any further shift clock pulses to the shift register.

In a preferred embodiment, shift register 32 comprises a plurality of Motorola MC4012P shift registers; comparator 31 is a Signetics DM8200 binary comparator; counter 35 is a Texas Instruments SN74193 counter; and NAND gates 33 and 36 are Texas Instruments SN7400 gates.

Recording of the seismic reflection signals as represented by the data bits at the output of shift register 32 can now be carried out conventionally under control of the CPU 24 on digital storage units such as the disc storage unit 25, the magnetic tape controller 26, and the magnetic tape transport 27. Disc storage unit may be one or more cyclical storage devices manufactured by Digital Development Corporation under Model 6200-128 (524K words). The magnetic tape controller 26 may be the National Computer Systems Controller Model UN-100, and the magnetic tape transport 27 may be comprised of at least one Ampex 9-track transport Model TMA-2.

We claim:
1. A method of processing seismic reflection signals, comprising:
   a. recording a plurality of seismic reflection signals in a plurality of recording channels,
   b. amplifying the seismic reflection signals in each recording channel by a given number of units of amplification,
   c. producing digital signals representative of the amplified seismic reflection signals in each recording channel, each digital signal being represented by a plurality of data bits,
   d. applying said digital signals from said recording channels to a plurality of shift registers,
   e. producing a digital gain signal representing the number of units of amplification applied to the seismic reflection signals, said gain signal being represented by a plurality of gain bits,
   f. generating clock pulses
   g. comparing the digital number represented by said gain bits with said clock pulses to produce a first control signal when the cumulative number of said clock pulses produced is less than the digital number represented by said gain bits and a second control signal when the cumulative number of said clock pulses produced equals the digital number represented by said gain bits, h. applying said clock pulses to said plurality of shift registers to shift the digital signals along said shift registers in response to said first control signal, and i. terminating the application of said clock pulses to said shift registers in response to said second control signal, whereby the position of the digital signals in said shift registers is representative of the amplitudes of the seismic reflection signals prior to amplification in said recording channels.

2. In a seismic exploration system having a source of seismic energy, a plurality of receivers for detecting seismic reflection signals, a recorder for amplifying each seismic reflection signal and producing a gain signal having a plurality of gain bits representing the number of units of amplification, and a converter for converting each seismic reflection signal to a plurality of digital samples having a plurality of data bits, the improvement comprising:

a. a shift register to which each digital sample of data bits is applied, b. means for generating clock pulses c. a counter for producing a digital count of the cumulative number of clock pulses, d. a comparator to which said digital count of clock pulses and said gain signal are applied, said comparator producing a first control signal when said digital count of clock pulses is less than the digital number represented by said gain bits and producing a second control signal when said digital count of clock pulses equals the number of units of amplification represented by said gain bits, e. means for applying said clock pulses to each said shift register in response to said first control signal to shift each said digital sample along said shift register one bit position for each clock pulse, and f. removing said clock pulses from each said shift register to terminate the shifting of the data bits along the shift register in response to said second control signal, the position of said digital sample in each said shift register following such shifting being representative of the amplitudes of the seismic reflection signals prior to amplification in the recorder.

* * * * *